Feb. 8, 1966   A. M. SANDAHL   3,233,901
PIT CUSHION ELEVATING MECHANISM
Filed Oct. 29, 1962   3 Sheets-Sheet 1
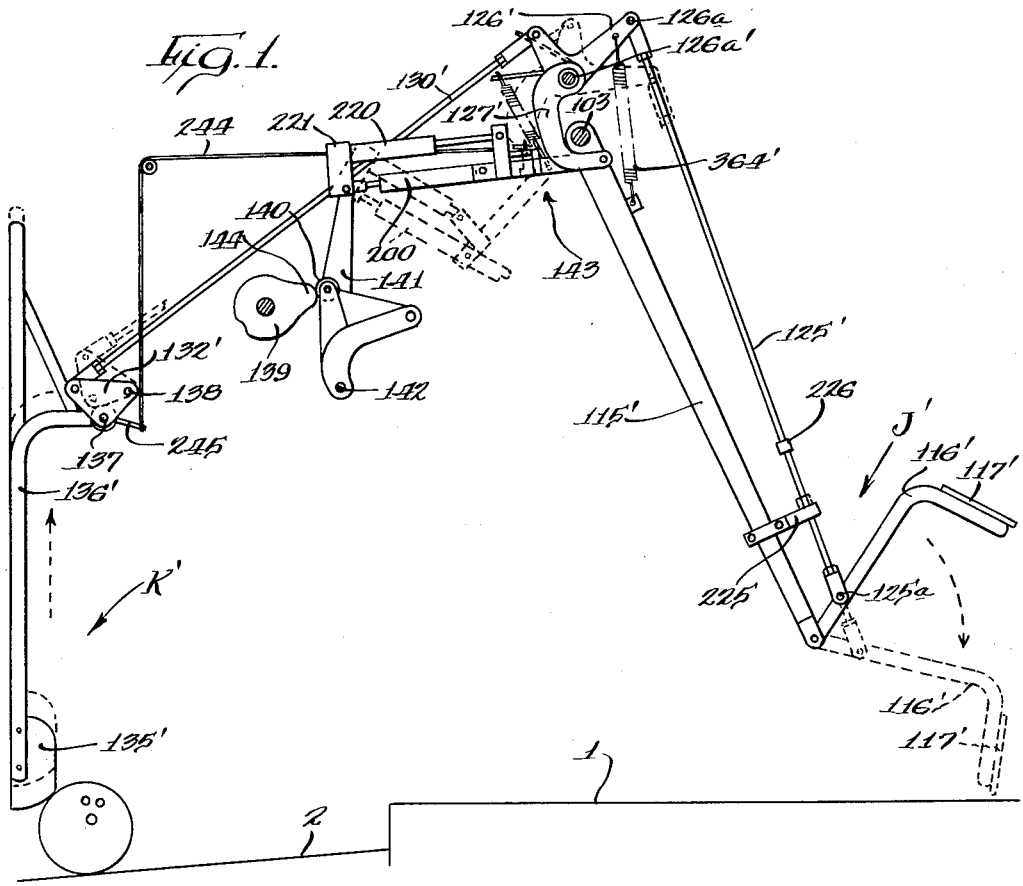
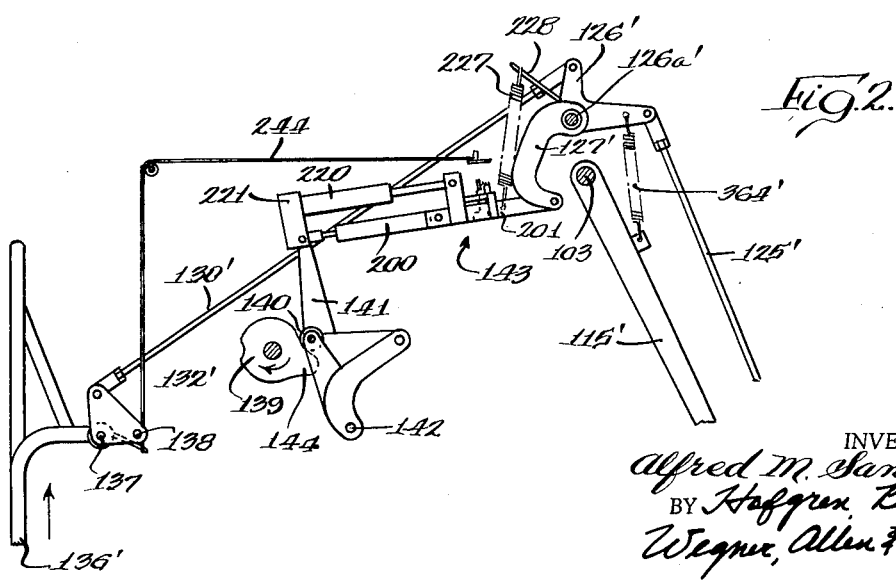
INVENTOR:
Alfred M. Sandahl
BY Hofgren, Brady,
Wegner, Allen & Stellman
Attys

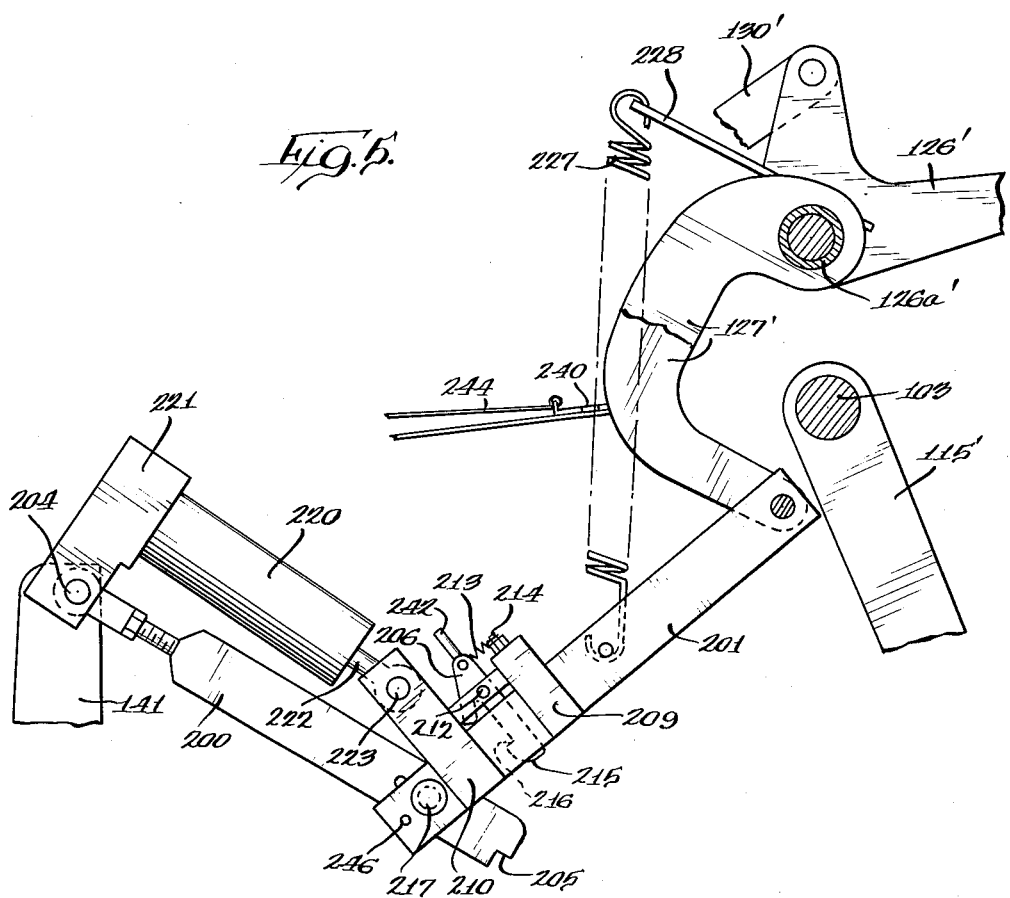

United States Patent Office
3,233,901
Patented Feb. 8, 1966

3,233,901
PIT CUSHION ELEVATING MECHANISM
Alfred M. Sandahl, Cheyenne, Wyo., assignor to Brunswick Corporation, a corporation of Delaware
Filed Oct. 29, 1962, Ser. No. 233,602
9 Claims. (Cl. 273—49)

This invention relates to automatic pinsetters and more particularly to mechanism for controlling the action of a rake having a guard position and a pit cushion to speed up and improve the operation of the pinsetter.

An object of this invention is to provide new and improved mechanism for causing operation of the rake of an automatic pinsetter to a guard position and elevation of a pit cushion to permit a ball to move therepast.

Another object of the invention is to provide an automatic pinsetter having a rake normally at rest a distance above the alley bed which can move downwardly to a guard position and a pit cushion disposed in the bowling alley pit which can be elevated to permit passage of a ball thereunder and means responsive to the entry of a ball into the pit and operative prior to cyclic operation of the pinsetter to cause lowering of the rake and raising of the pit cushion.

Another object of the invention is to provide an automatic pinsetter having cyclically operable drive means for operating a rake and a pit cushion in timed sequence during a cycle of operation and means responsive to a bowled ball for causing operation of either the rake or pit cushion or both prior to the normal operating time in the cycle as derived from the drive means for the pinsetter.

Yet another object of the invention is to provide an automatic pinsetter having a rake mounted for up and down movement and a pit cushion also mounted for up and down movement with interconnecting linkage therebetween for causing elevation of the cushion as the rake is lowered and means operated by a cam for causing cycling of the rake and pit cushion including a motion transmitting linkage having collapsible sections normally latched together which are released upon entry of a ball into the pit to permit collapse of said sections and lowering of the rake and raising of the cushion at a controlled rate.

Other objects and advantages will become readily apparent from the following detailed description taken in connection with the accompanying drawings, in which:

FIGURE 1 is a side elevational view of the mechanism and showing the parts in alternate positions;

FIGURE 2 is a fragmentary side elevational view similar to FIGURE 1 showing the parts in another operative position;

FIGURE 5 is a view similar to FIGURE 3 showing the linkage in a fully-collapsed position.

Figure 3:
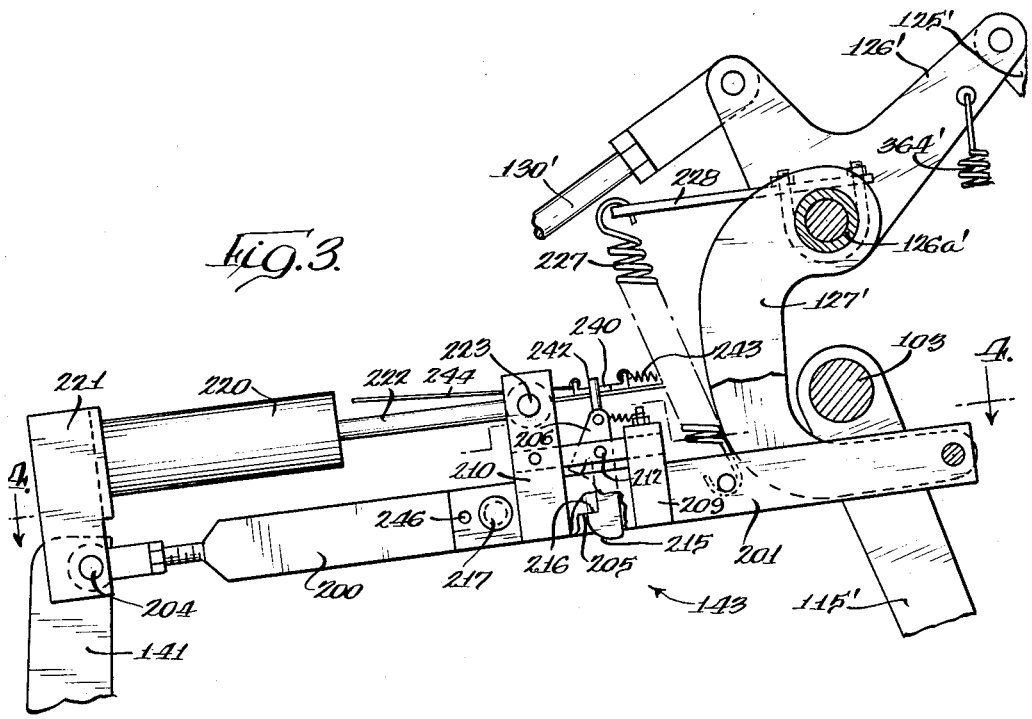
FIGURE 3 is a fragmentary side elevational view on an enlarged scale showing a part of the mechanism shown in FIGURE 1.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

The mechanism disclosed herein is shown in association with and as primarily designed for an automatic pinsetter of the type disclosed in Huck Patent No. 2,949,300, granted August 16, 1960. Reference may be made to the Huck patent for structural mounting details of various components and the same reference numerals are assigned to parts in this application corresponding to parts in the Huck patent with a prime affixed thereto.

The mechanism generally embodies a rake mechanism indicated generally at J' and a pit cushion structure indicated generally at K' forming part of an automatic pinsetter for association with an alley having a bed 1 and a pit 2. The rake J' embodies a pair of arms at opposite sides of the pinsetter one of which is indicated at 115'. These arms are mounted on a rotatable shaft 103' supported on the framework of the machine. The arms 115' each have an arm 116' extending forwardly therefrom with a generally right angular end mounting a rake board 117'. This rake board is normally held in an upper out-of-the-way position, as shown in full line in FIGURE 1, and is movable downwardly to a guard position, as shown in broken line in FIGURE 1, in which the rake lies closely adjacent the alley bed 1.

The movement of the rake board 117' between the two positions shown in FIGURE 1 is under the control of a pair of rods 125' (one of which is shown) associated one with each of the arms 116', and which is pivoted to the arm by a pin as indicated at 125a and at its upper end is connected to a bell crank 126' by a pin 126a. The movement imparted to the rods 125' is also transmitted to the pit cushion K' through a rod 130', there being a pair of these with one located at each side of the machine extended between the bell crank 126' and a triangular plate 132' forming part of the mounting for the pit cushion. The pit cushion is indicated at 135' and at its opposite ends is supported by a pair of vertically extending bars 136' (one of which is shown) there being one at each end of the pit cushion which are pivotally mounted to the plates 132' by a pin 137. The triangular plates 132' are each mounted to the frame for pivoting about a frame supported pin 138. With this construction, when a ball enters the pit the pit cushion is free to move backwardly in a clockwise direction about the pivot pins 137. Also the cushion can move vertically from the full line position shown in FIGURE 1 to the broken line position when the rake board 117' moves downwardly due to the motion transmitting connection defined by the rods 130'.

In normal operation the up and down movements of the pit cushion 135' and the rake board 117' are controlled from the gear box of the pinsetter and specifically from a cyclically driven cam 139 which coacts with a follower roller 140 mounted on a cam follower arm 141 pivoted at 142 to the frame of the machine. The cam follower arm 141 connects by a linkage indicated generally at 143 to an arm 127' which is affixed to a sleeve 126a' which mounts the bell cranks 126' and has these bell cranks secured thereto so that rotation of the sleeve results in movement of the bell cranks 126'.

In normal operation with the machine awaiting the rolling of a ball, the cam 139 is positioned to have a high 144 in engagement with the cam follower 140 to hold the rake board 117' in its upper position. Once the pinsetter begins to cycle and the cam 139 is rotated to the position shown in FIG. 2 the high 144 has moved beyond the cam follower 140 so that the cam follower can move to the left as viewed in FIGURE 2 which would permit the rake board 117' to lower and the pit cushion 135' to be elevated. This is accomplished by having the weight of the vertically movable rake mechanism along with the assistance of the springs 364' exceed the weight of the pit cushion.

It is the primary purpose of the invention disclosed herein to have lowering of the rake board 117' to the guard position and elevation of the pit cushion 135' occur prior to the normal cycling of the machine so that a ball may pass beneath the pit cushion as soon as possible as permitted by elevation of the cushion and the rake will be in a position to prevent pins from rolling forwardly along the alley bed. This is accomplished with the cam 139 still in a stationary position with its high 144 in engagement with the cam follower roller 140. This is the purpose of the collapsible linkage 143 extending between the cam follower arm 141 and the arm 127'. This linkage comprises a pair of collapsible sections 200 and 201 arranged in end-to-end relation with the section 201 being made up of spaced plates 202 and 203. The section 200 is pivoted to the cam follower arm 141 by a pin 204 and at the other end is formed with a notch 205 for engagement by a latch 206. The latch 206 is pivotally carried on the section 201 by being mounted between a pair of plates 207 and 208 extending between a U-shaped bracket 209 secured to the plates 202 and 203 of the link section 201 and a pair of bars 210 and 211 respectively also secured to the plates 202 and 203. The trigger 206 is urged in a clockwise direction about its mounting pin 212 as viewed in FIGURE 3 by a spring 213 extending between the latch and a pin 214 on top of the U-shaped bracket 209 with the movement of the latch limited by engagement of the latch with the surrounding frame.

The latch has a cam surface 215 formed at its lower end to permit counterclockwise pivoting of the latch when the link sections 200 and 201 are brought into alignment with each other and also has a notch 216 to engage with the notch 205 on the linkage sections 200 to hold the sections 200 and 201 in extended relation.

The parts are shown in extended relation in FIGURE 3 and when the latch 206 is pivoted in a counterclockwise direction the sections 200 and 201 are freed for movement relative to each other about a pin 217 which connects them together and the sections can move to the position shown in FIGURE 5 which results in clockwise pivoting of the arm 127' with similar rotation of the bell cranks 126' to lower the rake board 117' under the urging of gravity and elevate the pit cushion 135'. The rate of lowering of the rake is controlled by a dash pot which as shown in the drawings includes a pneumatic cylinder 220 pivotally secured at one end to a bracket 221 which may pivot about the pin 204 connecting the bracket to the cam follower arm 141 with the cylinder rod 222 pinned by a pin 223 to the plates 210 and 211 affixed to the link section 201. This cylinder provides for a controlled rate of descent of the rake. The actual lower limit of movement is determined by a pair of stop members 225 one of which is shown mounted on the rake arm 115' positioned to engage a stop lug 226 mounted on the rake rod 125.

After the linkage has collapsed it is urged to its in-line latched condition under the urging of a spring 227 connected between the link section 201 and a plate 228 fixed to the sleeve 126a'. The spring 227 is attempting to perform this function but cannot do so until the cam 139 has commenced its movement once the machine starts in cycle and moves the cam high 144 away from the follower roller 140 to the position shown in FIGURE 2. When this occurs the spring 227 is then effective to place the linkage in latched relation since it is not actually raising the rake. This is an important factor since when the rake 117' subsequently moves along the alley bed to sweep pins into the alley pit, the elevation of the rake 117' is controlled by the contour of the cam 139. The longitudinal movement of the rake is obtained by mechanism shown in the Huck patent and not disclosed herein. Also the cam 139 operates to raise the rake and lower the cushion as the high 144 moves to the rest position shown in FIGURE 1.

Figure 4:
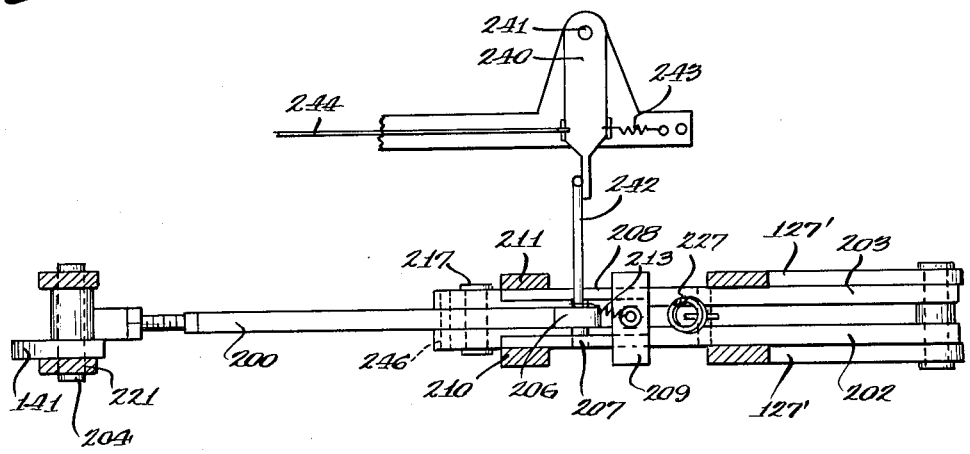
FIGURE 4 is a planned section taken generally along line 4—4 in FIGURE 3.

The latch 206 is released upon a ball hitting the pit cushion 135'. This is accomplished by a trigger 240 pivotally mounted by a pin 241 to the frame and engageable with a rod 242 affixed to the latch 206 and extending outwardly therefrom as shown in FIGURE 4. The trigger 240 is normally urged in a counterclockwise direction as viewed in FIGURE 4 by a spring 243 and is moved in the other direction by a cable 244 to trip the latch upon rearward movement of the pit cushion 135'. The cable 244 is connected to an arm 245 which moves with the pit cushion when a ball impacts the cushion. Alternatively the cable 244 can connect to the bell crank arm of the Huck patent, identified at 250 in the patent, which is moved upon engagement of the pit cushion by a bowling ball.

In the event the quick release mechanism described herein is not desired to be operative, the link sections 200 and 201 have aligned holes 246 therein for receiving a pin to lock the sections together so that the linkage will then operate exactly as the link 128 of the Huck patent.

I claim:

1. In an automatic pinsetter for use with a bowling alley having a pit comprising, a rake for sweeping pins from the alley to the pit and movable downwardly to a guard position ahead of a standing pin area on the alley, a pit cushion, means mounting said pit cushion for up and down movement, means interconnecting said cushion and rake for simultaneous movement with the rake normally urged down and the cushion urged up, powered means selectively operable for moving the rake and cushion in a cycle of the pinsetter, latch means holding said rake up and the cushion down, and means responsive to a ball entering the pit to release the latch whereby the rake lowers and the cushion moves up as a result of the normal urging thereof and without any drive force applied thereto.

2. In an automatic pinsetter for use with a bowling alley having a pit comprising, a rake for sweeping pins from the alley to the pit and movable downwardly to a guard position ahead of a standing pin area on the alley, a pit cushion, means mounting said pit cushion for up and down movement, means interconnecting said cushion and rake for simultaneous movement with the weight of the rake urging the rake down and the cushion up, powered means for raising said rake with resultant lowering of said cushion including a cam and a cam follower linkage, said linkage having collapsible sections in end-to-end relation and being constructed and arranged to permit lowering of the rake and raising of the cushion under the urging of the rake when said sections are collapsed, latch means for holding said sections against collapse, motion transmitting means responsive to a ball moving said cushion to free said latch means and permit collapse of said sections whereby the rake lowers and the cushion raises, and means for controlling the rate of collapse of said sections.

3. Mechanism as defined in claim 2 including means for limiting the downward movement of the rake as said sections collapse.

4. In an automatic pinsetter having a vertically movable pit cushion, a rake for sweeping pins from an alley movably interconnected with the cushion for up and down movement, a cyclically rotatable cam for positively raising the rake and lowering the cushion, and quick release mechanism for lowering of the rake and elevation of the cushion when a ball hits the pit cushion comprising a collapsible linkage including a cam follower for said cam and operatively connected to said rake, a latch for holding said linkage against collapse, a trigger for releasing said latch, a motion transmitting connection from the pit cushion to said trigger to release the latch when the ball hits the cushion, a dash pot connected to said linkage for controlling the rate of collapse thereof, and spring means for restoring said linkage to a latched condition after said cam commences to rotate.

5. In an automatic pinsetter for use with a bowling alley having a pit comprising, a rake for sweeping pins from the alley to the pit and movable downwardly to a guard position ahead of a standing pin area on the alley, a pit cushion, means mounting said pit cushion for up and down movement, means interconnecting said cushion and rake for simultaneous movement with the weight of the rake urging the rake down and the cushion up, powered means for raising said rake with resultant lowering of said cushion including a cam and a cam follower linkage, said linkage having collapsible sections in end-to-end relation and being constructed and arranged to permit lowering of the rake and raising of the cushion under the urging of the rake when said sections are collapsed, latch means for holding said sections against collapse, and means responsive to a bowled ball to free said latch means and permit collapse of said sections whereby the rake lowers and the cushion raises.

6. In an automatic pinsetter having a vertically movable pit cushion, a rake for sweeping pins from an alley movably interconnected with the cushion for up and down movement, a cyclically rotatable cam for positively raising the rake and lowering the cushion, and quick release mechanism for lowering of the rake and elevation of the cushion when a ball hits the pit cushion comprising a collapsible linkage including a cam follower for said cam and operatively connected to said rake, a latch for holding said linkage against collapse, a trigger for releasing said latch, a motion transmitting connection from the pit cushion to said trigger to release the latch when the ball hits the cushion, and means for restoring said linkage to a latched condition after said cam commences to rotate.

7. In an automatic pinsetter for use with a bowling alley having a pit, a rake for sweeping pins from the alley to the pit and movable downwardly to a guard position ahead of a standing pin area on the alley, a pit cushion, means mounting said pit cushion for up and down movement, means interconnecting said cushion and rake for simultaneous movement with the rake normally urged down and the cushion urged upwardly, powered means for raising said rake with resultant lowering of said cushion including a cam and a cam follower linkage, said linkage having sections connected for movement relative to each other to effect shortening of the length of the linkage and being constructed and arranged to permit lowering of the rake and raising of the cushion under the urging of the rake when said sections are collapsed, latch means for holding said sections against movement relative to each other, and means responsive to a bowled ball to free said latch means and permit movement of said sections whereby the rake lowers and the cushion raises.

8. In an automatic pinsetter for use with a bowling alley having a playing surface and a pit adjacent thereto, a frame, a rake mounted on the frame for up and down movement and for movement along the playing surface to sweep pins into the pit, power means for cycling the pinsetter and raising said rake to an inactive position, a pit cushion in said pit for absorbing the momentum of a rolled bowling ball, means mounting the pit cushion for elevating movement to provide a ball exit path therebeneath, and means independent of said power means for raising said pit cushion immediately upon contact thereof by a ball and prior to the normal time delay period of the pinsetter including said rake as a prime mover, a movable member normally positioned to maintain the prime mover inoperative, an operating device engageable with the member and movable to shift the member and render the prime mover operative, and a motion transmitting connection between the pit cushion and operating device for causing impact of a ball on the cushion to shift the operating device and initiate raising of the cushion.

9. In an automatic pinsetter for use with a bowling alley having a playing surface and a pit adjacent thereto, power means for cycling the pinsetter, a pit cushion in said pit for absorbing the momentum of a rolled bowling ball, means mounting the pit cushion for elevating movement to provide a ball exit path therebeneath, and means independent of said power means for raising said pit cushion immediately upon contact thereof by a ball and prior to the normal time delay period of the pinsetter including a prime mover, a movable member normally positioned to maintain the prime mover inoperative, an operating device engageable with the member and movable to shift the member and render the prime mover operative, and a motion transmitting connection between the pit cushion and operating device for causing impact of a ball on the cushion to shift the operating device and initiate raising of the cushion.

References Cited by the Examiner

UNITED STATES PATENTS

| | | | |
|---|---|---|---|
| 2,705,146 | 3/1955 | Montooth et al. | 273—43 |
| 2,949,300 | 8/1960 | Huck et al. | 273—43 |
| 2,991,078 | 7/1961 | Hedenskoog et al. | 273—43 |
| 3,014,720 | 12/1961 | Barrows | 273—42 |

DELBERT B. LOWE, *Primary Examiner.*